(12) United States Patent
Uribe et al.

(10) Patent No.: US 12,242,343 B2
(45) Date of Patent: *Mar. 4, 2025

(54) COMMAND ADDRESS FAULT DETECTION USING A PARITY PIN

(71) Applicant: Micron Technology, Inc., Boise, ID (US)

(72) Inventors: Melissa I. Uribe, El Dorado Hills, CA (US); Aaron P. Boehm, Boise, ID (US); Scott E. Schaefer, Boise, ID (US); Steffen Buch, Taufkirchen (DE)

(73) Assignee: Micron Technology, Inc., Boise, ID (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/049,454

(22) Filed: Oct. 25, 2022

(65) Prior Publication Data

US 2024/0134744 A1    Apr. 25, 2024
US 2024/0232008 A9    Jul. 11, 2024

(51) Int. Cl.
*G06F 11/10*       (2006.01)
*G06F 11/07*       (2006.01)

(52) U.S. Cl.
CPC ...... *G06F 11/1068* (2013.01); *G06F 11/0772* (2013.01); *G06F 11/102* (2013.01)

(58) Field of Classification Search
CPC . G06F 11/1068; G06F 11/0772; G06F 11/102
See application file for complete search history.

(56) References Cited

U.S. PATENT DOCUMENTS

| | | | |
|---|---|---|---|
| 6,247,070 B1 * | 6/2001 | Ryan | G06F 13/4243 711/2 |
| 7,240,148 B2 * | 7/2007 | Teng | G11C 11/40618 711/108 |
| 8,005,995 B2 * | 8/2011 | Ito | G06F 1/3228 365/233.5 |
| 9,262,265 B2 * | 2/2016 | Yoshihara | G06F 11/1076 |
| 9,477,549 B2 * | 10/2016 | Malshe | G11C 8/20 |
| 10,354,717 B1 * | 7/2019 | Brown | G11C 11/4076 |
| 10,432,230 B2 * | 10/2019 | Bueb | H03M 13/29 |
| 10,783,980 B2 * | 9/2020 | Waldrop | G06F 11/1016 |
| 11,249,847 B2 * | 2/2022 | Boehm | G06F 11/1068 |
| 11,487,610 B2 * | 11/2022 | Waldrop | G06F 11/1032 |
| 12,079,078 B2 * | 9/2024 | Uribe | G06F 11/0772 |
| 2013/0179758 A1 * | 7/2013 | Hwang | G06F 11/10 714/801 |

(Continued)

*Primary Examiner* — Guy J Lamarre
(74) *Attorney, Agent, or Firm* — Harrity & Harrity, LLP (57) ABSTRACT

Implementations described herein relate to command address fault detection using a parity bit. A memory device may receive, from a host device via a command address (CA) bus and during a unit interval, a set of CA bits associated with a CA word. The memory device may receive, from the host device via a parity bus and during the unit interval, a first parity bit that is based on the set of CA bits and a parity generation process. The memory device may generate a second parity bit based on the set of CA bits and the parity generation process. The memory device may compare the first parity bit and the second parity bit. The memory device may selectively transmit an alert signal to the host device based on a result of comparing the first parity bit and the second parity bit.

25 Claims, 6 Drawing Sheets

(56) References Cited

U.S. PATENT DOCUMENTS

| | | | |
|---|---|---|---|
| 2017/0331493 A1* | 11/2017 | Yu | G06F 11/1068 |
| 2017/0371745 A1* | 12/2017 | Lee | G11C 7/04 |
| 2018/0081754 A1* | 3/2018 | Berman | G06F 11/108 |
| 2019/0121755 A1* | 4/2019 | Yang | G06F 11/108 |
| 2019/0288691 A1* | 9/2019 | Mazumder | G11C 7/1087 |

* cited by examiner

COMMAND ADDRESS FAULT DETECTION USING A PARITY PIN

TECHNICAL FIELD

The present disclosure generally relates to memory devices, memory device operations, and, for example, to command address fault detection using a parity pin.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

A system may include a memory device and a host device, which may communicate with one another using a bus. Different packages (e.g., packages that vary in size, density, architecture, other aspects, or any combination thereof) may be used to contain the memory device. A package that contains the memory device may include multiple pins that are coupled with the bus and provide access to and from components within the memory device. In some examples, one or more of the pins may be coupled with data lines of the bus and one or more of the pins may be coupled with control lines of the bus.

In some examples, the system (e.g., the host device, the memory device, or both the host device and the memory device together) may be configured to satisfy a failure rate metric. For example, the system may be configured so that a Failure in Time (FIT) rate (e.g., a number of failures that are expected to occur in one billion hours for the system) is below a threshold. In some cases, faults in the packaging of the memory device that affect a command/address (CA) bus, a clock, or control signals in the silicon may result in undetected failures. An undetected failure may occur when the memory device does not receive a command, does not recognize a command, reads from a wrong address, or writes to a wrong address, among other examples. In some cases, to satisfy the failure rate metric, the system may employ data reliability techniques that reduce such failures by enabling the host device and/or the memory device to detect, correct, or discard erroneous or invalid data, or any combination thereof. However, some of these data reliability techniques may not be able to identify command or address related errors. For example, certain error-correcting code (ECC) schemes may be able to detect and correct errors that occur within the data path, but may not be able to detect or correct errors that occur on the CA bus (e.g., since the memory device may not receive the command that includes the error).

In some cases, the memory device may need to have an undetected FIT rate (e.g., a FIT rate for undetected failures) that is below the threshold or below another threshold. In automotive applications, such as in the example of autonomous vehicles, the undetected FIT rate for the memory device may need to be less than 0.4 FIT. However, FIT rates experienced by some memory devices may not satisfy this threshold (e.g., the memory devices may have FIT rates that are greater than the threshold). For example, command faults in the memory device may contribute 1 FIT, gross faults that affect the ability of the memory device to receive commands may contribute 7 FIT, and address faults may contribute 8 FIT. These example faults (among other faults) may result in no drive (e.g., the memory device not performing a read), wrong data (e.g., the memory device reading from a wrong address), lost data (e.g., the memory device not performing a write, or writing to the wrong location), or outputs at termination or Hi-Z. This may be especially problematic in the case of autonomous vehicles, where an error in the memory device may decrease the safety of the vehicle.

Some techniques described herein enable fault detection, and in particular, detection of faults associated with a CA bus. A host device may generate a CA word associated with a command signal or an address signal, and may transmit one or more sets of CA bits associated with the CA word to a memory device via a CA bus and during a unit interval. The CA word may include a plurality of sets of CA bits, where each set of CA bits corresponds to a portion of the CA word that is transmitted over a respective unit interval of a plurality of unit intervals for transmitting the CA word. The host device may generate a first parity bit (e.g., a host device parity bit) based on the set of CA bits and a parity generation process, and may transmit the parity bit to the memory device via a parity bus. In some implementations, the host device may concurrently transmit (e.g., transmit during the same unit interval) the set of CA bits associated with the CA word (via the CA bus) and the first parity bit (via the parity bus) to the memory device. In some implementations, each unit interval transmission of the CA word may include a set of CA bits and a corresponding parity bit. In one example, the CA word may include four sets of CA bits that are transmitted via the CA bus during four respective unit intervals. The host device may generate four parity bits associated with each respective set of CA bits, and may transmit each parity bit (via the parity bus) concurrently with the corresponding set of CA bits.

The memory device may receive the set of CA bits associated with the CA word based on the host device transmitting the set of CA bits associated with the CA word via the CA bus during the unit interval. Additionally, the memory device may receive the first parity bit based on the host device transmitting the first parity bit via the parity bus during the unit interval. For example, the memory device may receive the first set of CA bits associated with the CA word via the CA bus during the unit interval, and may receive the first parity bit via the parity bus during the same unit interval. The memory device may generate a second parity bit (e.g., a memory device parity bit) using the parity generation process, such as the same parity generation process used by the host device to generate the first parity bit. In some examples, the memory device may generate a memory device parity bit based on each unit interval transmission of the CA word. For example, the memory device may receive a first set of CA bits associated with the CA word and may generate a first memory device parity bit based on the first set of CA bits (e.g., prior to receiving a second set of CA bits associated with the CA word). In some other examples, the memory device may generate multiple memory device parity bits based on an entirety of the CA word. For example, the memory device may receive four sets of CA bits associated with the CA word during four respective unit intervals, and may generate four memory device parity bits based on an entirety of the CA word.

In some implementations, the memory device may compare the first parity bit (the host device parity bit) and the second parity bit (the memory device parity bit), and may selectively transmit an alert signal to the host device based on a result of comparing the first parity bit and the second parity bit. In some examples, the memory device may separately compare each host device parity bit with each memory device parity bit. For example, the memory device may compare a first host device parity bit with a first memory device parity bit (e.g., before receiving a second host device parity bit). Subsequently, the memory device may compare the second host device parity bit with a second memory device parity bit. The memory device may activate a fail flag based on any of the host device parity bits not matching any of the corresponding memory device parity bits. Alternatively, the memory device may activate a valid flag based on all of the host device parity bits matching all of the corresponding memory device parity bits. In some other examples, the memory device may compare all of the host device parity bits with all of the corresponding memory device parity bits. For example, the memory device may compare the memory device parity bits, generated based on the entirety of the CA word, with all of the received host device parity bits associated with the CA word. The memory device may activate a fail flag based on all of the host device parity bits not matching all of the corresponding memory device parity bits. Alternatively, the memory device may activate a valid flag based on all of the host device parity bits matching all of the corresponding memory device parity bits. In some implementations, the host device may initiate a corrective action, such as a safety procedure, based on identifying that the CA word is invalid. For example, the host device may initiate the corrective action based on the fail flag being activated or based on the valid flag not being activated within a time period. In the example automotive application, the host device may cause the autonomous vehicle to pull to the side of a road or to alert a driver of the vehicle to take manual control. In another example, the host device may attempt another transmission of the CA word to the memory device. The techniques described herein may improve the FIT rate for the system, such as by increasing the detection of errors associated with the CA bus, thereby improving the safety and reliability of the system.

Figure 1:
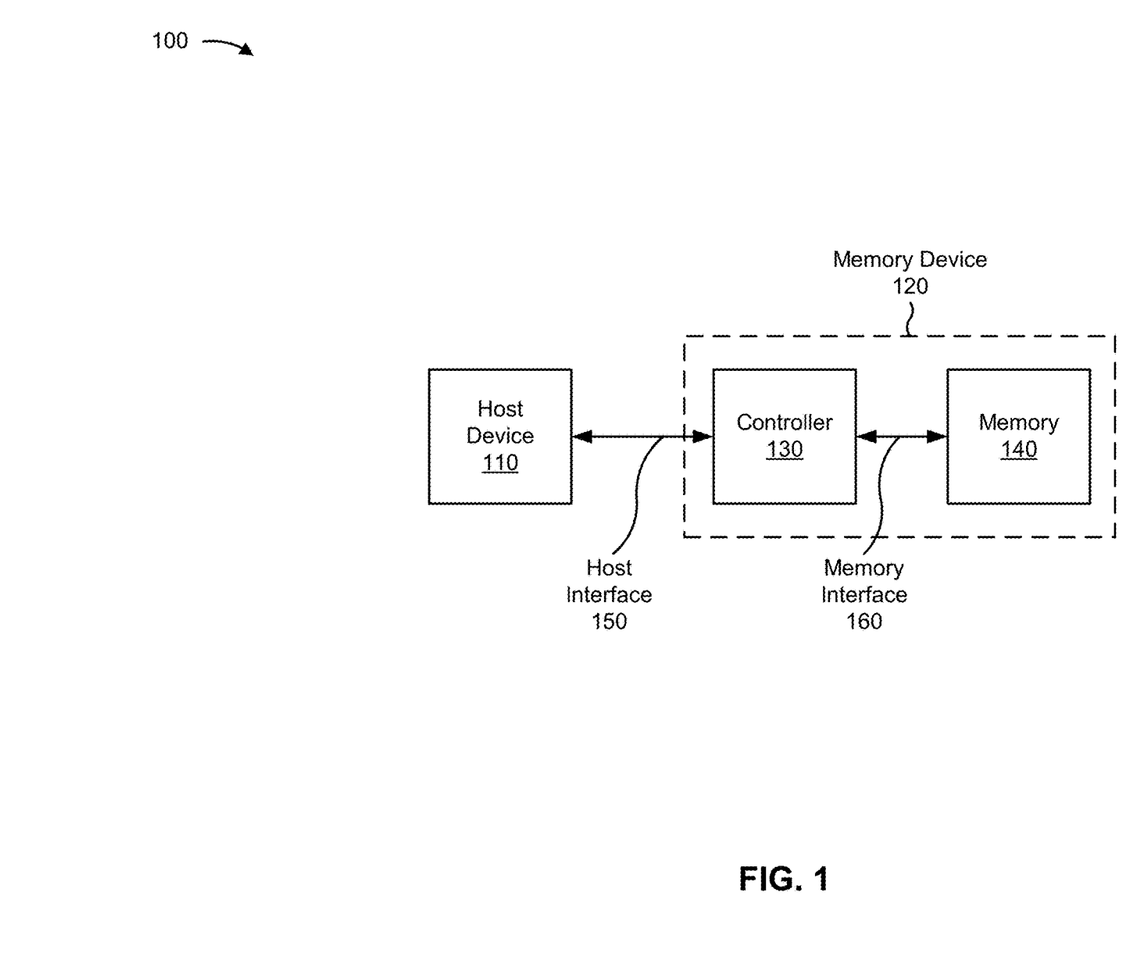
FIG. 1 is a diagram illustrating an example system capable of command address fault detection using a parity pin.

FIG. 1 is a diagram illustrating an example system 100 capable of command address fault detection using a parity pin. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component. In some implementations, the host device 110 may be or may be included in automotive applications, such as autonomous vehicles.

The memory device 120 may be any electronic device configured to store data in memory. In some implementations, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some implementations, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
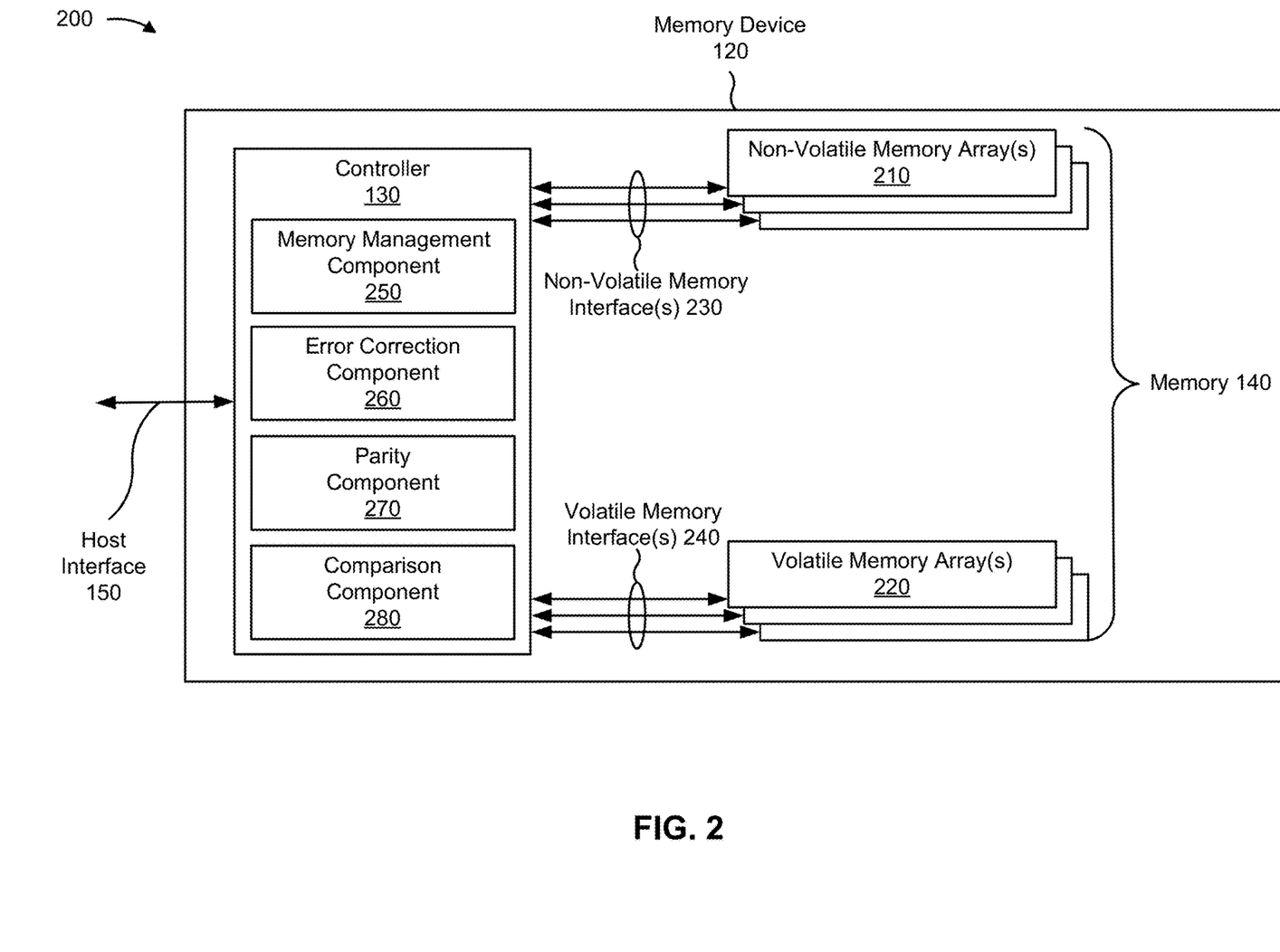
FIG. 2 is a diagram of example components included in a memory device.

FIG. 2 is a diagram of example components 200 included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to, and receive signals from, a non-volatile memory array 210 using a non-volatile memory interface 230. The controller 130 may transmit signals to, and receive signals from, a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, a parity component 270, and/or a comparison component 280. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE). In some implementations, the error correction component 260 may use an on-die error-correcting code (ECC) to detect and/or correct the errors associated with the memory device 120. The on-die ECC may mask the SBEs of the memory device 120. For example, when the on-die ECC is enabled, the error correction component 260 may detect and/or correct MBEs only. Alternatively, when the on-die ECC is disabled, the error correction component 260 may detect and/or correct both SBEs and MBEs. In some cases, the ECC may be an inline ECC, which means that the ECC codes are stored on the memory device 120 with the data that is to be tested.

The parity component 270 may be configured to generate one or more parity bits (e.g., memory device parity bits). The parity component 270 may generate the one or more parity bits based on one or more sets of CA bits associated with a CA word that is received from the host device 110, such as a CA word that is generated by the CA component 330 (described below). The parity component 270 may generate the parity bits, based on the set of CA bits associated with CA word, using any type of parity generation process. For example, the parity component 270 may generate the parity bits by applying a Hamming Code or a cyclic redundancy check (CRC) algorithm to one or more sets of CA bits associated with the CA word, among other examples. In some implementations, the memory device 120 may generate a parity bit each time that a unit interval transmission of the CA word is received, such as each time that a set of CA bits associated with the CA word is received from the host device 110. A unit interval may correspond to a clock cycle of the system 100, such as a clock cycle associated with the memory device 120. In some other implementations, the memory device 120 may generate multiple parity bits based on receiving an entirety of the CA word from the host device 110 over multiple unit intervals. Additional details are described below.

The comparison component 280 may be configured to compare parity bits. For example, the comparison component 280 may compare a memory device parity bit, such as a parity bit generated by the parity component 270 associated with the memory device 120, with a host device parity bit, such as a parity bit generated by the parity component 340 associated with the host device 110. The comparison component 280 may determine whether a CA word received from the host device 110 is valid based on comparing one or more memory device parity bits with one or more host device parity bits. In some examples, the comparison component 280 may determine whether the CA word received from the host device 110 is valid based on separately comparing each memory device parity bit with each host device parity bit. In some other examples, the comparison component 280 may determine whether the CA word received from the host device 110 is valid based on comparing all of the memory device parity bits with all of the host device parity bits. In some examples, the comparison component 280 may activate a fail flag or may activate a valid flag based on a result of comparing the memory device parity bit(s) with the host device parity bit(s). Additional details regarding these features are described below.

Figure 4:
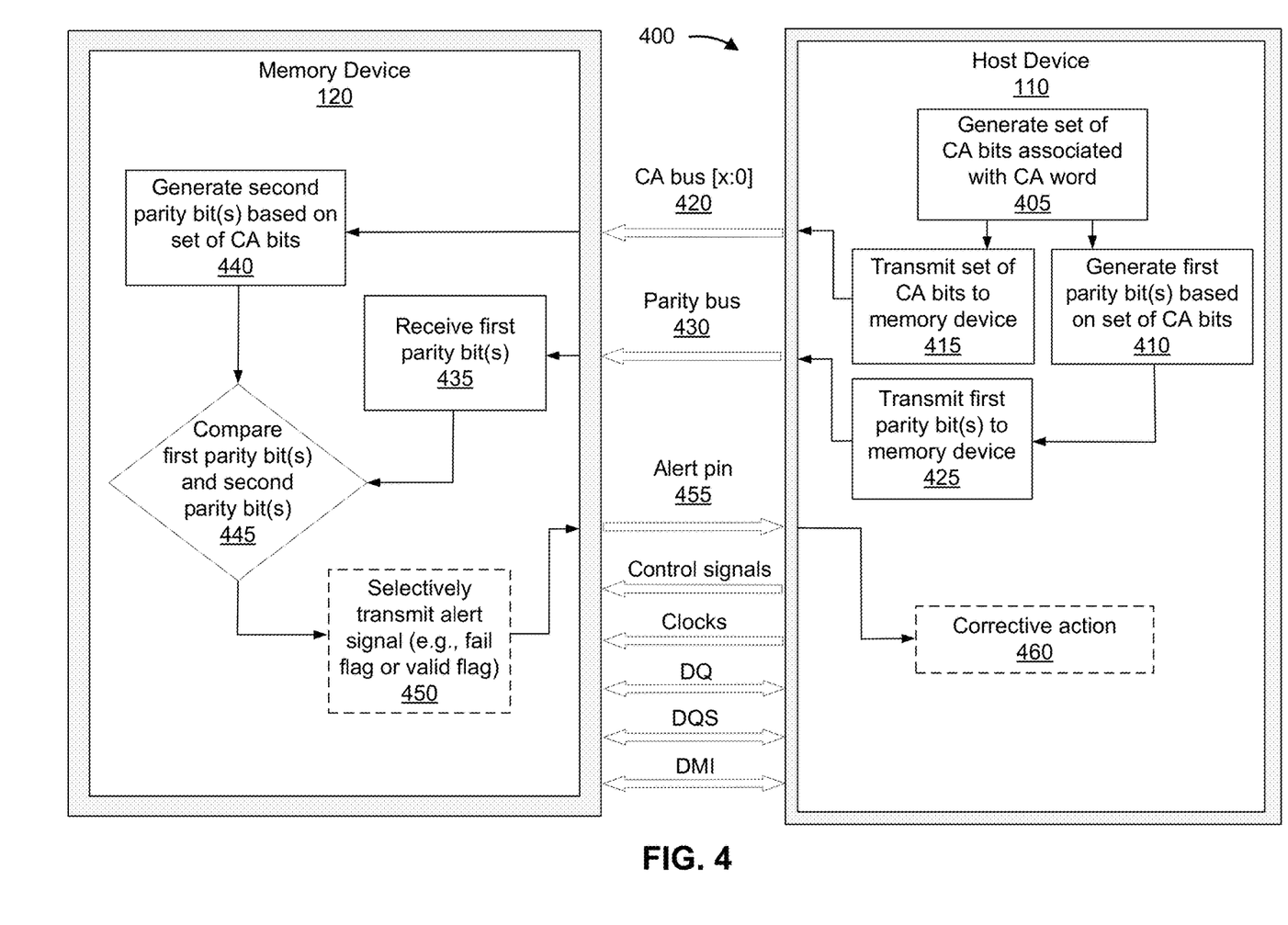
FIG. 4 is a diagram illustrating an example of command address fault detection using a parity pin.
Figure 6:
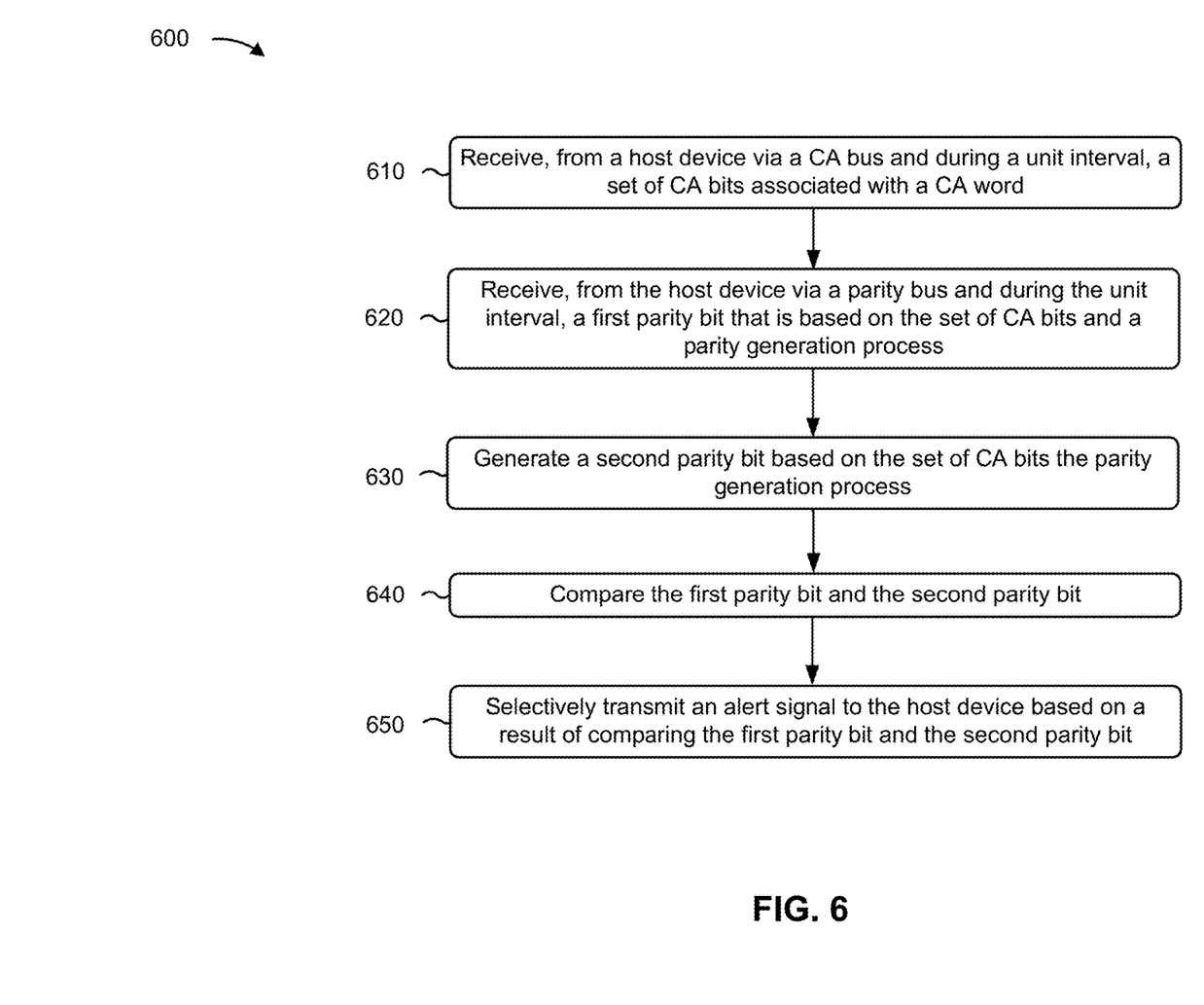
FIG. 6 is a flowchart of an example method associated with command address fault detection using a parity pin.

One or more devices or components shown in FIG. 2 may be used to carry out operations described elsewhere herein, such as one or more operations of FIG. 4 and/or one or more process blocks of the methods of FIG. 6. For example, the controller 130, the parity component 270, and/or the comparison component 280 may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
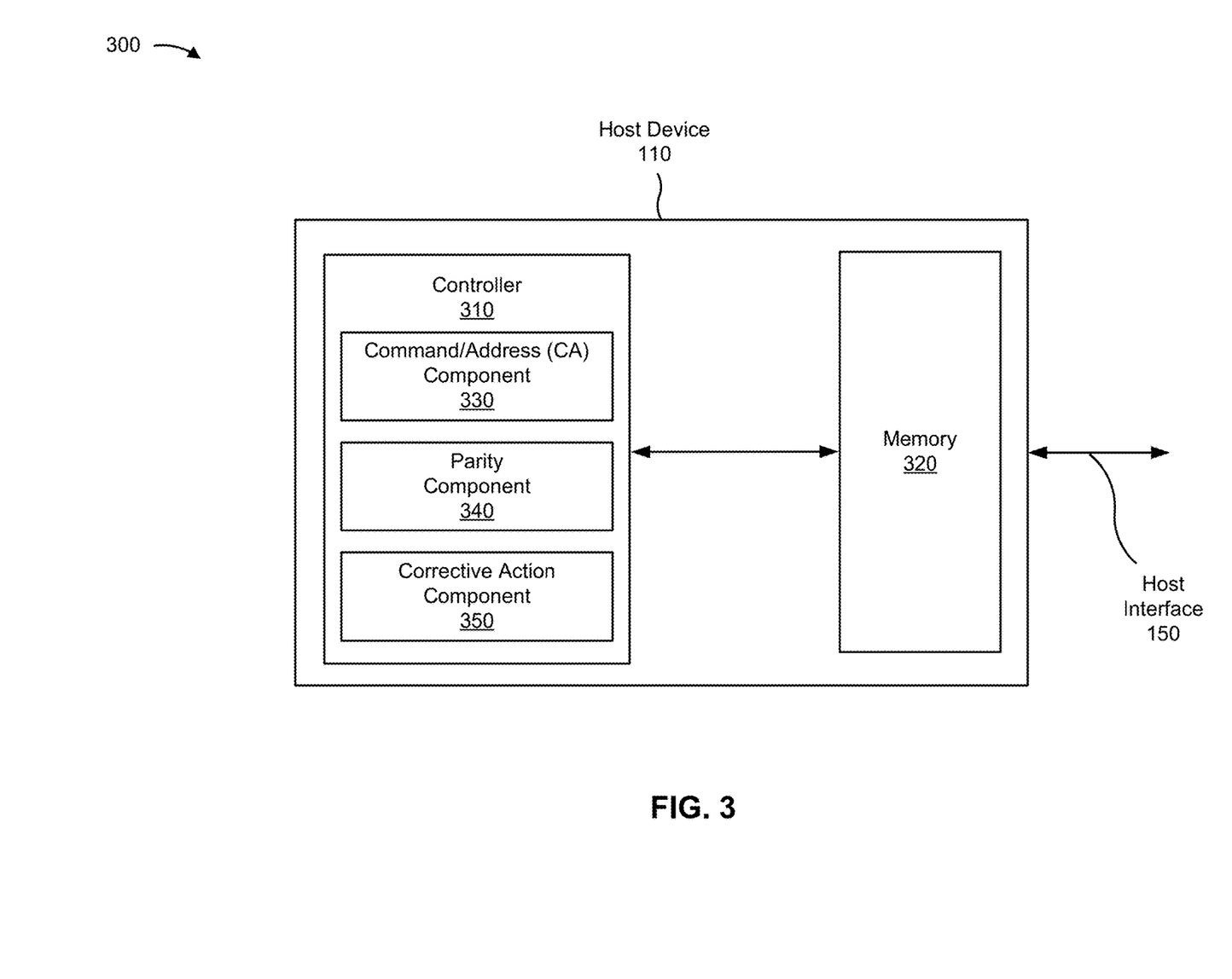
FIG. 3 is a diagram of example components included in a host device.

FIG. 3 is a diagram of example components 300 included in a host device 110. The host device 110 may include a controller 310 and memory 320. The controller 310 associated with the host device 110 may include some or all of the features of the controller 130 associated with the memory device 120. Additionally, or alternatively, the memory 320 associated with the host device 110 may include some or all of the features of the memory 140 associated with the memory device 120.

The controller 310 may control operations of the memory 320, such as by executing one or more instructions. For example, the host device 110 may store one or more instructions in the memory 320, and the controller 310 may execute those one or more instructions. Additionally, or alternatively, the controller 310 may receive one or more instructions from the memory device 120 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 310. The controller 310 may execute the set of instructions to perform one or more operations or methods described herein. In some implementations, execution of the set of instructions, by the controller 310, causes the controller 310 and/or the host device 110 to perform one or more operations or methods described herein. In some implementations, hardwired circuitry is used instead of or in combination with the one or more instructions to perform one or more operations or methods described herein. Additionally, or alternatively, the controller 310 and/or one or more components of the host device 110 may be configured to perform one or more operations or methods described herein.

As shown in FIG. 3, the controller 310 may include a CA component 330, a parity component 340, and/or a corrective action component 350. In some implementations, one or more of these components are implemented as one or more instructions (e.g., firmware) executed by the controller 310. Alternatively, one or more of these components may be implemented as dedicated integrated circuits distinct from the controller 310.

The CA component 330 may be configured to generate a CA word. The CA word may be associated with an instruction, such as a read command or a write command, that is to be transmitted by the host device 110 to the memory device 120. In some implementations, the CA component 330 may generate multiple sets of CA bits associated with the CA word. Each set of CA bits associated with the CA word may correspond to a unit interval transmission of the CA word. In some implementations, the CA word may be transmitted to the memory device 120 via one or more CA buses, such as the CA bus 420 described herein. For example, each set of CA bits associated with the CA word may be transmitted via the CA bus during a unit interval of a plurality of unit intervals for transmitting the CA word, and each CA bit of the set of CA bits may be transmitted via a respective pin of the CA bus during a corresponding unit interval.

The parity component 340 may be configured to generate one or more parity bits (e.g., host device parity bits). The parity component 340 may generate the one or more parity bits based on a CA word, such as the CA word that is generated by the CA component 330. In some implementations, the parity component 340 may generate a host device parity bit for a set of CA bits associated with the CA word, such as for each unit interval transmission of the CA word. For example, if the CA word includes four sets of CA bits that are to be transmitted to the memory device over four respective unit intervals, the parity component 340 may generate four host device parity bits, where each host device parity bit corresponds to a respective set of CA bits. The parity component 340 may generate the host device parity bits using any type of parity generation process. For example, the parity component 340 may generate the host device parity bits by applying a Hamming Code or a CRC algorithm to a set of CA bits associated with the CA word, among other examples. The parity component 340 associated with the host device 110 may include some or all of the features of the parity component 270 associated with the memory device 120. For example, the parity component 340 may generate the host device parity bits using the same parity generation process that is used by the parity component 270 for generating the memory device parity bits.

The corrective action component 350 may be configured to initiate one or more corrective actions, such as one or more safety procedures, based on identifying that the CA word is invalid. For example, the corrective action component 350 may initiate the one or more corrective actions based on the memory device 120 activating a fail flag or based on the memory device 120 not activating a valid flag within a time period. In some implementations, the invalid CA word may result from the memory device 120 not receiving a command or not recognizing the command. This may result in the memory device 120 and/or the system 100 experiencing one or more errors. For example, the invalid CA word may result in the memory device 120 reading from a wrong address or writing to the wrong address. In the example of autonomous vehicles, the invalid CA word may decrease the safety of the vehicle associated with the memory device 120. In this case, the corrective action component 350 may initiate one or more safety procedures, such as causing the autonomous vehicle to pull to the side of a road, to alert a driver of the vehicle to take manual control, or to initiate a restart or shut down procedure (e.g., if the vehicle is not currently being used). In another example, the corrective action component 350 may cause the host device 110 to attempt another transmission of the CA word to the memory device 120. This may improve the likelihood that the memory device 120 properly receives the CA word if the error occurred during the transmission over the CA bus and/or if the error was transient in nature. In this case, the system 100 may continue to operate without interruption.

One or more devices or components shown in FIG. 3 may be used to carry out operations described elsewhere herein, such as one or more operations of FIG. 4 and/or one or more process blocks of the methods of FIG. 6. For example, the controller 310, the parity component 340, and/or the corrective action component 350 may perform one or more operations and/or methods for the host device 110.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

As indicated above, FIG. 3 is provided as an example. Other examples may differ from what is described with regard to FIG. 3.

FIG. 4 is a diagram illustrating an example 400 of CA fault detection. The memory device 120 may communicate with the host device 110. The memory device 120 may include a controller 130 and a memory 140. The controller 130 may include a memory management component 250, an error correction component 260, a parity component 270, and/or a comparison component 280, among other examples. The host device 110 may include a controller 310 and a memory 320. The controller 310 may include a CA component 330, a parity component 340, and/or a corrective action component 350, among other examples.

As shown by reference number 405, the host device 110 may generate one or more sets of CA bits associated with a CA word. For example, the CA component 330 associated with the host device 110 may generate the one or more sets of CA bits associated with the CA word. The CA word may be associated with an instruction, such as a read command or a write command that is to be transmitted to the memory device 120. For example, the CA word may be an instruction to the memory device 120 to read one or more bits of data from a particular memory section of the memory device 120. Additionally, or alternatively, the CA word may be an instruction to the memory device 120 to write one or more bits of data to a particular memory section of the memory device 120. In some implementations, the CA word may include a plurality of sets of CA bits. Each set of CA bits, of the plurality of sets of CA bits associated with the CA word, may correspond to a portion of the CA word that is transmitted by the host device 110 (and/or received by the memory device 120) during a respective unit interval of a plurality of unit intervals for transmitting (or receiving) the CA word. Additional details are described below.

As shown by reference number 410, the host device 110 may generate a first parity bit (e.g., a memory device parity bit). For example, the parity component 340 associated with the host device 110 may generate the first parity bit. The parity component 340 may generate the first parity bit based on the set of CA bits associated with the CA word. In some implementations, the host device 110 and/or the parity component 340 may generate the first parity bit based on the set of CA bits associated with the CA word using any type of parity generation process. In one example, the parity component 340 may generate the first parity bit by applying a Hamming Code to the set of CA bits. In another example, the parity component 340 may generate the first parity bit by applying a CRC algorithm to the set of CA bits. However, as described herein, any type of parity generation process may be used to generate the first parity bit (or multiple parity bits) based on the set of CA bits.

As shown by reference number 415, the host device 110 may transmit the set of CA bits associated with the CA word to the memory device 120. The host device 110 may transmit the set of CA bits to the memory device 120 via the CA bus 420. In some implementations, the CA bus 420 may include a number of CA pins. For example, a CA bus [x:0] may include x CA pins for transmitting the set of CA bits from the host device 110 to the memory device 120. In some implementations, each CA pin of the CA bus 420 may be used for transmitting a respective CA bit of a set of CA bits associated with the CA word. In one example, the CA word may include sixteen bits, and the CA bus 420 may include four CA pins. In this example, the CA word may include four sets of CA bits, where each set of CA bits is transmitted by the host device 110 to the memory device 120 during a respective unit interval of a plurality of unit intervals for transmitting the CA word, and each CA pin of the CA bus 420 is used for transmitting a respective CA bit of the set of CA bits during the respective unit interval for transmitting the set of CA bits. In this case, each unit interval of the plurality of unit intervals for transmitting the CA word may include a transmission of a set of CA bits (e.g., four CA bits), where each CA bit of the set of CA bits is transmitted using a respective CA pin of the CA bus 420. The entirety of the CA word may be transmitted after four unit intervals (e.g., four clock cycles).

As shown by reference number 425, the host device 110 may transmit the first parity bit (e.g., the host device parity bit). The host device 110 may transmit the first parity bit to the memory device 120 via the parity bus 430. In some implementations, the host device 110 may generate a parity bit for each set of CA bits transmitted by the host device 110. Using the example above, the CA word may include four sets of CA bits that are transmitted via the CA bus 420 during four respective unit intervals. In this example, the host device 110 may generate a parity bit for each set of CA bits and/or for each unit interval transmission of the CA word. In some implementations, the host device 110 may send the first parity bit concurrently with the set of CA bits. For example, during each unit interval, the host device 110 may transmit a set of CA bits (via the CA bus 420) and a host device parity bit (via the parity bus 430) that is based on the set of CA bits associated with the unit interval. In the example in which the CA word includes four sets of CA bits, the host device 110 may transmit a first set of CA bits and a first host device parity bit that is based on the first set of CA bits during a first unit interval, a second set of CA bits and a second host device parity bit that is based on the second set of CA bits during a second unit interval, a third set of CA bits and a third host device parity bit that is based on the third set of CA bits during a third unit interval, and a fourth set of CA bits and a fourth host device parity bit that is based on the fourth set of CA bits during a fourth unit interval.

As shown by reference number 435, the memory device 120 may receive the first parity bit (e.g., the host device parity bit) from the host device 110. The memory device 120 may receive the first parity bit from the host device 110 via the parity bus 430. As described above, the memory device 120 may receive a plurality of host device parity bits from the host device 110 during a plurality of unit intervals, where each host device parity bit corresponds to a set of CA bits that are transmitted during a respective unit interval.

As shown by reference number 440, the memory device 120 may generate a second parity bit (e.g., a memory device parity bit). For example, the parity component 270 associated with the memory device 120 may generate the second parity bit based on the set of CA bits associated with the CA word. The memory device 120 and/or the parity component 270 may generate the second parity bit, based on the CA word, using any type of parity generation process, such as the Hamming Code or the CRC algorithm described herein. In some implementations, the memory device 120 (and/or the parity component 270) may use the same parity generation process as the host device 110 (and/or the parity component 340). For example, the host device 110 may generate the first parity bit (host device parity bit) using a select parity generation process, and the memory device 120 may generate the second parity bit (memory device parity bit) using the same select parity generation process.

In some implementations, the parity component 270 associated with the memory device 120 and/or the parity component 340 associated with the host device 110 may be configured to use multiple parity techniques or algorithms. For example, the parity component 340 may be configured to generate the first parity bit, and the parity component 270 may be configured to generate the second parity bit, using the Hamming Code or the CRC algorithm. In some cases, the memory device 120 and the host device 110 may communicate regarding which of the parity generation techniques or algorithms is to be used to generate the first parity bit and/or the second parity bit. For example, the host device 110 may generate the first parity bit using a select parity generation algorithm (e.g., a CRC algorithm), and may instruct the memory device 120 to generate the second parity bit using the select parity generation algorithm (e.g., the CRC algorithm).

In some implementations (e.g., in a first example), the memory device 120 may generate a memory device parity bit each time that a set of CA bits is received by the memory device 120. For example, each time that a set of CA bits is received by the memory device 120 via the CA bus 420, the memory device 120 may store the set of CA bits in an input buffer and may generate a memory device parity bit corresponding to the set of CA bits. In the example in which the memory device 120 receives four sets of CA bits during four respective unit intervals, the memory device 120 may generate four memory device parity bits, respectively, based on each of the four sets of CA bits. For example, the memory device 120 may receive a first set of CA bits associated with the CA word during a first unit interval, and may generate a first memory device parity bit corresponding to the first set of CA bits. In some cases, the memory device 120 may generate the first memory device parity bit during the first unit interval and/or prior to receiving a second set of CA bits associated with the CA word during a second unit interval.

In some other implementations (e.g., in a second example), the memory device 120 may generate the memory device parity bits based on an entirety of the CA word. For example, the memory device 120 may receive a plurality of sets of CA bits associated with the CA word over a plurality of respective unit intervals. The memory device 120 may store the plurality of sets of CA bits in an input buffer and may generate (e.g., rebuild) the CA word based on the plurality of sets of CA bits. The memory device 120 may generate a plurality of memory device parity bits based on the CA word (e.g., the entirety of the CA word). In the example in which the memory device 120 receives four sets of CA bits during four respective unit intervals, the memory device 120 may receive the four sets of CA bits, store the four sets of CA bits in an input buffer, generate (e.g., rebuild) the CA word based on the four sets of CA bits, and generate four memory device parity bits based on the CA word.

As shown by reference number 445, the memory device 120 may compare the first parity bit (the host device parity bit) and the second parity bit (the memory device parity bit). For example, the memory device 120 and/or the comparison component 280 may compare the first parity bit generated by the parity component 340 associated with the host device 110 and the second parity bit generated by the parity component 270 associated with the memory device 120. The comparison component 280 may determine whether the CA word received from the host device 110 is valid based on comparing the first parity bit and the second parity bit. The comparison component 280 may determine that the CA word received from the host device 110 is valid based on the first parity bit matching (e.g., being identical to) the second parity bit. Alternatively, the comparison component 280 may determine that the CA word received from the host device 110 is invalid based on the first parity bit not matching (e.g., not being identical to) the second parity bit.

In the first example described above, the memory device 120 may compare each host device parity bit with each received memory device parity bit. For example, the memory device 120 may receive a first set of CA bits and a corresponding first host device parity bit from the host device 110. The memory device 120 may generate a first memory device parity bit based on the first set of CA bits, and may compare the first host device parity bit with the first memory device parity bit. Similarly, the memory device 120 may receive a second set of CA bits and a corresponding second host device parity bit from the host device 110, generate a second memory device parity bit based on the second set of CA bits, and compare the second host device parity bit with the second memory device parity bit. In some cases, the memory device 120 may compare the first host device parity bit and the first memory device parity bit prior to receiving the second set of CA bits and/or the second host device parity bit.

In the second example described above, the memory device 120 may compare all of the host device parity bits with all of the memory device parity bits. For example, the memory device may receive four sets of CA bits and four host device parity bits, where each host device parity bit corresponds to a respective set of CA bits of the four sets of CA bits. The memory device 120 may generate four memory device parity bits after generating (e.g., rebuilding) the CA word based on the four sets of CA bits associated with the CA word. The memory device 120 may compare the four host device parity bits with the four memory device parity bits.

As shown by reference number 450, the memory device 120 may selectively transmit an alert signal. In some implementations, the memory device may selectively transmit the alert signal via alert pin 455. The alert pin 455 may be a unidirectional pin (e.g., data pin) that carries signaling from the memory device 120 to the host device 110. For example, the alert pin 455 may be used to transmit signaling from the memory device 120 to the host device 110 based on the memory device 120 comparing the first parity bit (the host device parity bit) and the second parity bit (the memory device parity bit).

In some implementations, the alert signal may be associated with a fail flag. The fail flag may be set to a first state (e.g., an inactive state or "0") by default, and may be set to a second state (e.g., an active state or "1") based on the first parity bit not matching (e.g., being different than) the second parity bit. The fail flag may alert the host device 110 of command faults and/or address faults on the package or silicon that affect the CA bus 420. In the first example described above, the memory device 120 may separately compare each host device parity bit with each memory device parity bit. The memory device 120 may set the fail flag to the second state (e.g., may activate the fail flag) based on any host device parity bit not matching a corresponding memory device parity bit. For example, if the first host device parity bit (associated with the first set of CA bits) and the first memory device parity bit (associated with the first set of CA bits) are not identical, the memory device 120 may set the fail flag to the second state. In the second example described above, the memory device 120 may compare all of the host device parity bits with all of the memory device parity bits. The memory device 120 may set the fail flag to the second state (e.g., may activate the fail flag) based on all of the host device parity bits not matching all of the memory device parity bits. For example, if the four host device parity bits (associated with the entirety of the CA word) and the four memory device parity bits (associated with the entirety of the CA word) are not identical, the memory device 120 may set the fail flag to the second state.

In some implementations, the alert signal may be associated with a valid flag. The valid flag may be set to the first state (e.g., the inactive state or "0") by default, and may be set to the second state (e.g., the active state or "1") based on the first parity bit matching the second parity bit. The valid flag may alert the host device 110 of command faults and/or address faults on the package or silicon that affect the CA bus 420. Additionally, the valid flag may alert the host device 110 to gross faults that affect the ability of the memory device 120 to receive commands. In the first example described above, the memory device 120 may separately compare each host device parity bit with each memory device parity bit. The memory device 120 may set the valid flag to the second state (e.g., may activate the valid flag) based on every host device parity bit matching every memory device parity bit. For example, the memory device 120 may compare the first host device parity bit with the first memory device parity bit, and may separately compare the second host device parity bit with the second memory device parity bit. If the first host device parity bit matches the first memory device parity bit, and the second host device parity bit matches the second memory device parity but, the memory device 120 may set the valid flag to the second state. In the second example described above, the memory device 120 may compare all of the host device parity bits with all of the memory device parity bits. The memory device 120 may set the valid flag to the second state (e.g., may activate the valid flag) based on all of the host device parity bits matching all of the memory device parity bits.

As shown by reference number 460, the host device 110 may perform the corrective action. In some implementations, the host device 110 and/or the corrective action component 350 may be configured to initiate one or more corrective actions based on the CA word being invalid. For example, the host device 110 may initiate the one or more corrective actions based on receiving the fail flag or based on not receiving the valid flag within a time period. Alternatively, the host device 110 and/or the corrective action component 350 may not initiate any corrective actions based on the CA word being valid. For example, the host device 110 may not initiate the one or more corrective actions based on not receiving the fail flag or based on receiving the valid flag within the time period.

In some implementations, the invalid CA word may result from the memory device 120 not receiving a command or not recognizing the command. This may result in the memory device 120 and/or the system 100 experiencing one or more errors. For example, the invalid CA word may result in the memory device 120 reading from a wrong address or writing to the wrong address. In the example of autonomous vehicles, the invalid CA word may decrease the safety of the vehicle associated with the memory device 120. In this case, the host device 110 and/or the corrective action component 350 may initiate one or more safety procedures, such as causing the autonomous vehicle to pull to the side of a road, to alert a driver of the vehicle to take manual control, or to initiate a restart or shut down procedure (e.g., if the vehicle is not currently being used). In another example, the corrective action component 350 may cause the host device 110 to attempt another transmission of the CA word to the memory device 120. This may improve the likelihood that the memory device 120 properly receives the CA word if the error occurred during the transmission over the CA bus and/or if the error was transient in nature. In this case, the system 100 may continue to operate without interruption.

As shown in the figure, the host device 110 and the memory device 120 may communicate via one or more buses. A bus may be a group of electrical lines or wires that can carry computer signals. The electrical lines may be categorized based on a function of the electrical line or the components associated with the electrical line. For example, power lines may provide electrical power to attached components, command lines may provide control for the synchronization and operation of the bus and its modules, address lines may designate the source or destination of a data signal, and data lines may carry data or instructions between components. As described herein, the CA bus may be a unidirectional bus for transmitting a CA word from the host device 110 to the memory device 120. Additionally, or alternatively, the host device 110 and the memory device 120 may communicate control signals, clock signals, data (DQ) signals, data strobe encoding (DQS) signals, or data mask inversion (DMI) signals, among other examples. The control signals may be used to set up communication channels between the host device 110 and the memory device 120 and to control the flow of data. For example, a control signal may be used by the host device 110 to indicate, to the memory device 120, which of the parity generation techniques or algorithms is to be used by the memory device 120 to generate the second parity bit. The clock signal may be a square wave signal that assists the memory device 120 and/or the host device 110 with timing and control. The DQ signal may be transmitted on every leading edge and/or on every falling edge of the clock, and the DQS signal may be used to help with timing and to improve jitter tolerance for the system 100. The DMI signal may be a bi-directional signal that is driven high to indicate that data on a data bus is inverted or that is driven low to indicate that the data is in a normal (e.g., non-inverted) state.

As indicated above, FIG. 4 is provided as an example. Other examples may differ from what is described with regard to FIG. 4.

Figure 5:
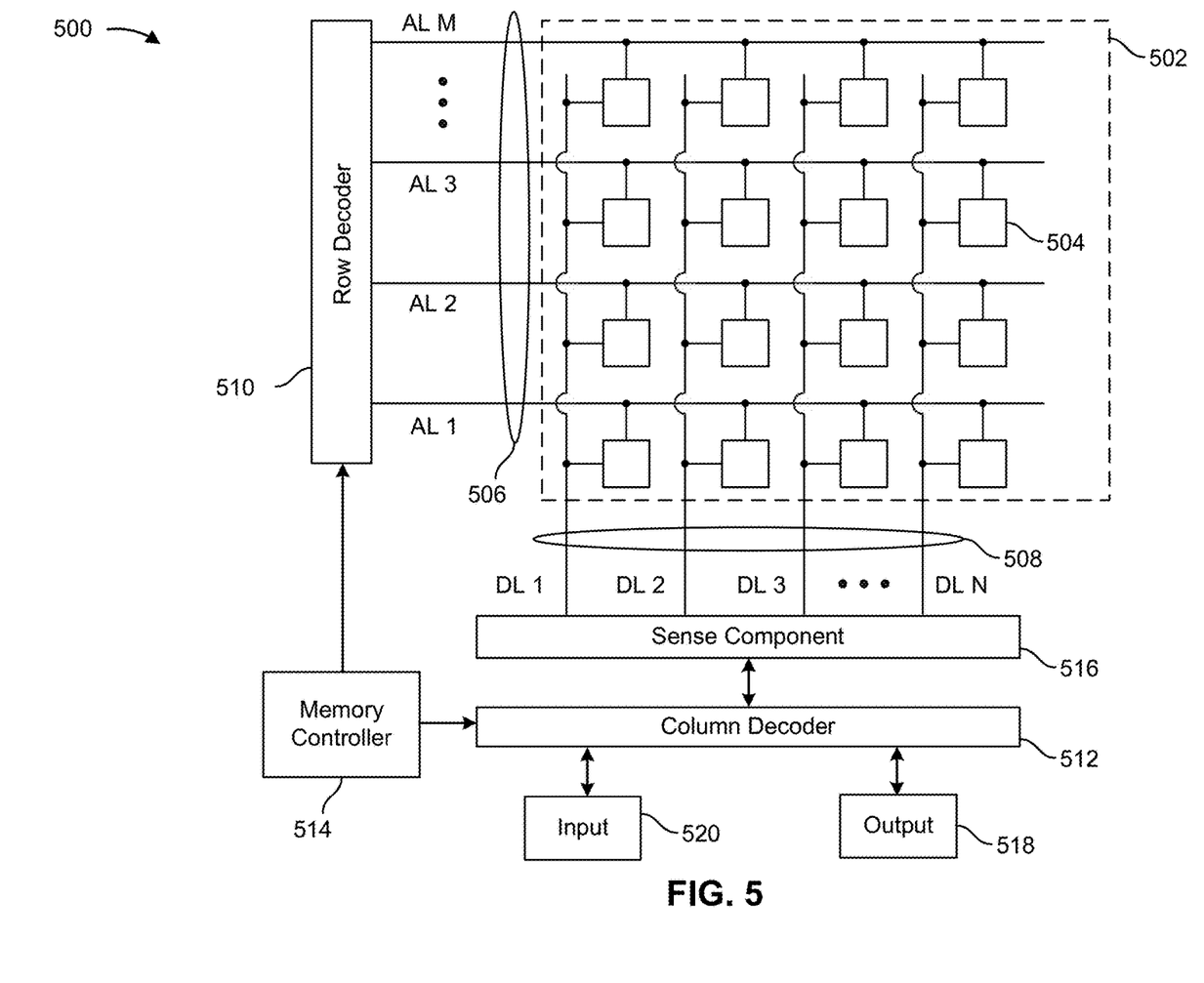
FIG. 5 is a diagrammatic view of an example memory device.

FIG. 5 is a diagrammatic view of an example memory device 500. The memory device 500 may include a memory array 502 that includes multiple memory cells 504. A memory cell 504 is programmable or configurable into a data state of multiple data states (e.g., two or more data states). For example, a memory cell 504 may be set to a particular data state at a particular time, and the memory cell 504 may be set to another data state at another time. A data state may correspond to a value stored by the memory cell 504. The value may be a binary value, such as a binary 0 or a binary 1, or may be a fractional value, such as 0.5, 1.5, or the like. A memory cell 504 may include a capacitor to store a charge representative of the data state. For example, a charged and an uncharged capacitor may represent a first data state and a second data state, respectively. As another example, a first level of charge (e.g., fully charged) may represent a first data state, a second level of charge (e.g., fully discharged) may represent a second data state, a third level of charge (e.g., partially charged) may represent a third data state, and so son.

Operations such as reading and writing (i.e., cycling) may be performed on memory cells 504 by activating or selecting the appropriate access line 506 (shown as access lines AL 1 through AL M) and digit line 508 (shown as digit lines DL 1 through DL N). An access line 506 may also be referred to as a "row line" or a "word line," and a digit line 508 may also be referred to a "column line" or a "bit line." Activating or selecting an access line 506 or a digit line 508 may include applying a voltage to the respective line. An access line 506 and/or a digit line 508 may comprise, consist of, or consist essentially of a conductive material, such as a metal (e.g., copper, aluminum, gold, titanium, or tungsten) and/or a metal alloy, among other examples. In FIG. 5, each row of memory cells 504 is connected to a single access line 506, and each column of memory cells 504 is connected to a single digit line 508. By activating one access line 506 and one digit line 508 (e.g., applying a voltage to the access line 506 and digit line 508), a single memory cell 504 may be accessed at (e.g., is accessible via) the intersection of the access line 506 and the digit line 508. The intersection of the access line 506 and the digit line 508 may be called an "address" of a memory cell 504.

In some implementations, the logic storing device of a memory cell 504, such as a capacitor, may be electrically isolated from a corresponding digit line 508 by a selection component, such as a transistor. The access line 506 may be connected to and may control the selection component. For example, the selection component may be a transistor, and the access line 506 may be connected to the gate of the transistor. Activating the access line 506 results in an electrical connection or closed circuit between the capacitor of a memory cell 504 and a corresponding digit line 508. The digit line 508 may then be accessed (e.g., is accessible) to either read from or write to the memory cell 504.

A row decoder 510 and a column decoder 512 may control access to memory cells 504. For example, the row decoder 510 may receive a row address from a memory controller 514 and may activate the appropriate access line 506 based on the received row address. Similarly, the column decoder 512 may receive a column address from the memory controller 514 and may activate the appropriate digit line 508 based on the column address.

Upon accessing a memory cell 504, the memory cell 504 may be read (e.g., sensed) by a sense component 516 to determine the stored data state of the memory cell 504. For example, after accessing the memory cell 504, the capacitor of the memory cell 504 may discharge onto its corresponding digit line 508. Discharging the capacitor may be based on biasing, or applying a voltage, to the capacitor. The discharging may induce a change in the voltage of the digit line 508, which the sense component 516 may compare to a reference voltage (not shown) to determine the stored data state of the memory cell 504. For example, if the digit line 508 has a higher voltage than the reference voltage, then the sense component 516 may determine that the stored data state of the memory cell 504 corresponds to a first value, such as a binary 1. Conversely, if the digit line 508 has a lower voltage than the reference voltage, then the sense component 516 may determine that the stored data state of the memory cell 504 corresponds to a second value, such as a binary 0. The detected data state of the memory cell 504 may then be output (e.g., via the column decoder 512) to an output component 518 (e.g., a data buffer). A memory cell 504 may be written (e.g., set) by activating the appropriate access line 506 and digit line 508. The column decoder 512 may receive data, such as input from input component 520, to be written to one or more memory cells 504. A memory cell 504 may be written by applying a voltage across the capacitor of the memory cell 504.

The memory controller 514 may control the operation (e.g., read, write, re-write, refresh, and/or recovery) of the memory cells 504 via the row decoder 510, the column decoder 512, and/or the sense component 516. The memory controller 514 may generate row address signals and column address signals to activate the desired access line 506 and digit line 508. The memory controller 514 may also generate and control various voltages used during the operation of the memory array 502.

As indicated above, FIG. 5 is provided as an example. Other examples may differ from what is described with respect to FIG. 5.

FIG. 6 is a flowchart of an example method 600 associated with command address fault detection using a parity pin. In some implementations, a memory device (e.g., memory device 120) may perform or may be configured to perform one or more process blocks of FIG. 6. In some implementations, another device or a group of devices separate from or including the memory device (e.g., the system 100 and/or the host device 110) may perform or may be configured to perform one or more process blocks of FIG. 6. Additionally, or alternatively, one or more components of the memory device (e.g., the controller 130 and/or the parity component 270) may perform or may be configured to perform one or more process blocks of FIG. 6.

As shown in FIG. 6, the method 600 may include receiving, from a host device via CA bus and during a unit interval, a set of CA bits associated with a CA word (block 610). The CA word may include a plurality of sets of CA bits, where each set of CA bits corresponds to a portion of the CA word that is received over a respective unit interval of a plurality of unit intervals for receiving the CA word. As further shown in FIG. 6, the method 600 may include receiving, from the host device via a parity bus and during the unit interval, a first parity bit that is based on the set of CA bits and a parity generation process (block 620). As further shown in FIG. 6, the method 600 may include generating a second parity bit based on the set of CA bits and the parity generation process (block 630). As further shown in FIG. 6, the method 600 may include comparing the first parity bit and the second parity bit (block 640). As further shown in FIG. 6, the method 600 may include selectively transmitting an alert signal to the host device based on a result of comparing the first parity bit and the second parity bit (block 650).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIG. 4.

In some implementations, a memory device includes one or more components configured to: receive, from a host device via a CA bus and during a unit interval, a set of CA bits associated with a CA word, wherein the CA word includes a plurality of sets of CA bits, each set of CA bits corresponding to a portion of the CA word that is received over a respective unit interval of a plurality of unit intervals for receiving the CA word; receive, from the host device via a parity bus and during the unit interval, a first parity bit that is based on the set of CA bits and a parity generation process; generate a second parity bit based on the set of CA bits and the parity generation process; compare the first parity bit and the second parity bit; and selectively transmit an alert signal to the host device based on a result of comparing the first parity bit and the second parity bit.

In some implementations, a system comprises a host device configured to: transmit, to a memory device via a CA bus and during a unit interval, a set of CA bits associated with a CA word, wherein the CA word includes a plurality of sets of CA bits, each set of CA bits corresponding to a portion of the CA word that is transmitted over a respective unit interval of a plurality of unit intervals for transmitting the CA word; generate a first parity bit based on the set of CA bits and a parity generation process; and transmit, to the memory device via a parity bus and during the unit interval, the first parity bit; and the memory device, wherein the memory device is configured to: receive, from the host device via the CA bus and during the unit interval, the set of CA bits; receive, from the host device via the parity bus and during the unit interval, the first parity bit; generate a second parity bit based on the set of CA bits and the parity generation process; compare the first parity bit and the second parity bit; and selectively transmit an alert signal to the host device based on a result of comparing the first parity bit and the second parity bit.

In some implementations, a method performed by a memory device includes receiving, from a host device via CA bus and during a unit interval of a plurality of unit intervals, a set of CA bits associated with a CA word; receiving, from the host device via a parity bus and during the unit interval, a first parity bit that is based on the set of CA bits and a parity generation process; generating a second parity bit based on the set of CA bits and the parity generation process; and transmitting an alert signal to the host device, via the parity bus or an alert bus, based on a result of comparing the first parity bit and the second parity bit.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
receive, from a host device via a command address (CA) bus and during a unit interval, a set of CA bits associated with a CA word, wherein the CA word includes a plurality of sets of CA bits, each set of CA bits corresponding to a portion of the CA word that is received over a respective unit interval of a plurality of unit intervals for receiving the CA word;
receive, from the host device via a parity bus and during the unit interval, a first parity bit that is based on the set of CA bits and a parity generation process;
generate a second parity bit based on the set of CA bits and the parity generation process;

compare the first parity bit and the second parity bit; and selectively transmit an alert signal to the host device via a unidirectional alert bus and based on a result of comparing the first parity bit and the second parity bit, wherein the unidirectional alert bus is different than the CA bus.

2. The memory device of claim 1, wherein each unit interval of the plurality of unit intervals comprises a first transmission via the CA bus that includes a respective set of CA bits of the plurality of sets of CA bits associated with the CA word and a second transmission via the parity bus that includes a parity bit that is based on the respective set of CA bits, wherein the first transmission is concurrent with the second transmission.

3. The memory device of claim 1, wherein the one or more components, to compare the first parity bit and the second parity bit, are configured to compare, for each set of CA bits associated with the CA word that is received over a respective unit interval of the plurality of unit intervals, a first parity bit that is received from the host device based on the set of CA bits and the parity generation process and a second parity bit that is generated by the memory device based on the set of CA bits and the parity generation process.

4. The memory device of claim 3, wherein the one or more components, to selectively transmit the alert signal based on the result of comparing the first parity bit and the second parity bit, are configured to activate a fail flag based on any first parity bit, associated with the CA word and received from the host device, not matching a corresponding second parity bit associated with the CA word and generated by the memory device.

5. The memory device of claim 3, wherein the one or more components, to selectively transmit the alert signal based on the result of comparing the first parity bit and the second parity bit, are configured to activate a valid flag based on all first parity bits, associated with the CA word and received from the host device, matching all corresponding second parity bits associated with the CA word and generated by the memory device.

6. The memory device of claim 1, wherein the one or more components are configured to generate the CA word based on receiving the plurality of sets of CA bits over the plurality of unit intervals.

7. The memory device of claim 6, wherein the one or more components, to compare the first parity bit and the second parity bit, are configured to compare a first set of parity bits that are received from the host device based on the CA word and the parity generation process and a second set of parity bits that are generated by the memory device based on the CA word and the parity generation process.

8. The memory device of claim 7, wherein the one or more components, to selectively transmit the alert signal based on the result of comparing the first parity bit and the second parity bit, are configured to activate a fail flag based on the first set of parity bits not matching the second set of parity bits.

9. The memory device of claim 7, wherein the one or more components, to selectively transmit the alert signal based on the result of comparing the first parity bit and the second parity bit, are configured to activate a valid flag based on the first set of parity bits matching the second set of parity bits.

10. The memory device of claim 1, wherein the one or more components, to receive the set of CA bits via the CA bus during the unit interval, are configured to receive a first bit of the set of CA bits via a first pin of the CA bus and a second bit of the set of CA bits via a second pin of the CA bus during the unit interval.

11. The memory device of claim 1, wherein the unidirectional alert bus is different than the parity bus.

12. A system comprising:
a host device configured to:
transmit, to a memory device via a command address (CA) bus and during a unit interval, a set of CA bits associated with a CA word, wherein the CA word includes a plurality of sets of CA bits, each set of CA bits corresponding to a portion of the CA word that is transmitted over a respective unit interval of a plurality of unit intervals for transmitting the CA word;
generate a first parity bit based on the set of CA bits and a parity generation process; and
transmit, to the memory device via a parity bus and during the unit interval, the first parity bit; and
the memory device, wherein the memory device is configured to:
receive, from the host device via the CA bus and during the unit interval, the set of CA bits;
receive, from the host device via the parity bus and during the unit interval, the first parity bit;
generate a second parity bit based on the set of CA bits and the parity generation process;
compare the first parity bit and the second parity bit; and
selectively transmit an alert signal to the host device via a unidirectional alert bus and based on a result of comparing the first parity bit and the second parity bit, wherein the unidirectional alert bus is different than the CA bus.

13. The system of claim 12, wherein the memory device, to compare the first parity bit and the second parity bit, is configured to compare, for each set of CA bits associated with the CA word that is received over a respective unit interval of the plurality of unit intervals, a first parity bit that is received from the host device based on the set of CA bits and the parity generation process and a second parity bit that is generated by the memory device based on the set of CA bits and the parity generation process.

14. The system of claim 13, wherein the memory device, to selectively transmit the alert signal based on the result of comparing the first parity bit and the second parity bit, is configured to:
activate a fail flag based on any first parity bit, associated with the CA word and received from the host device, not matching a corresponding second parity bit associated with the CA word and generated by the memory device; or
activate a valid flag based on all first parity bits, associated with the CA word and received from the host device, matching all corresponding second parity bits associated with the CA word and generated by the memory device.

15. The system of claim 14, wherein the host device is configured to identify an error associated with the set of CA bits based on receiving an indication of the fail flag or based on not receiving an indication of the valid flag within a time period.

16. The system of claim 12, wherein the memory device is configured to generate the CA word based on receiving the plurality of sets of CA bits over the plurality of unit intervals.

17. The system of claim 16, wherein the memory device, to compare the first parity bit and the second parity bit, is configured to compare a first set of parity bits that are received from the host device based on the CA word and the parity generation process and a second set of parity bits that are generated by the memory device based on the CA word and the parity generation process.

18. The system of claim 17, wherein the memory device, to selectively transmit the alert signal based on the result of comparing the first parity bit and the second parity bit, is configured to:
- activate a fail flag based on the first set of parity bits not matching the second set of parity bits; or
- activate a valid flag based on the first set of parity bits matching the second set of parity bits.

19. The system of claim 18, wherein the host device is configured to identify an error associated with the set of CA bits based on receiving an indication of the fail flag or based on not receiving an indication of the valid flag within a time period.

20. A method performed by a memory device, comprising:
- receiving, from a host device via a command address (CA) bus and during a unit interval of a plurality of unit intervals, a set of CA bits associated with a CA word;
- receiving, from the host device via a parity bus and during the unit interval, a first parity bit that is based on the set of CA bits and a parity generation process;
- generating a second parity bit based on the set of CA bits and the parity generation process; and
- transmitting an alert signal to the host device, via a unidirectional alert bus, based on a result of comparing the first parity bit and the second parity bit, wherein the unidirectional alert bus is different than the CA bus.

21. The method of claim 20, wherein comparing the first parity bit and the second parity bit comprises comparing, for each set of CA bits associated with the CA word that is received over a respective unit interval of the plurality of unit intervals, a first parity bit that is received from the host device based on the set of CA bits and the parity generation process and a second parity bit that is generated by the memory device based on the set of CA bits and the parity generation process.

22. The method of claim 21, wherein transmitting the alert signal based on the result of comparing the first parity bit and the second parity bit comprises:
- activating a fail flag based on any first parity bit, associated with the CA word and received from the host device, not matching a corresponding second parity bit associated with the CA word and generated by the memory device; or
- activating a valid flag based on all first parity bits, associated with the CA word and received from the host device, matching all corresponding second parity bits associated with the CA word and generated by the memory device.

23. The method of claim 20, further comprising generating the CA word based on receiving a plurality of sets of CA bits over the plurality of unit intervals.

24. The method of claim 23, wherein comparing the first parity bit and the second parity bit comprises comparing a first set of parity bits that are received from the host device based on the CA word and the parity generation process and a second set of parity bits that are generated by the memory device based on the CA word and the parity generation process.

25. The method of claim 24, wherein transmitting the alert signal based on a result of comparing the first parity bit and the second parity bit comprises:
- activating a fail flag based on the first set of parity bits not matching the second set of parity bits; or
- activating a valid flag based on the first set of parity bits matching the second set of parity bits.

* * * * *